United States Patent
Hilliard et al.

(10) Patent No.: US 12,530,375 B2
(45) Date of Patent: Jan. 20, 2026

(54) AUTOMATIC ANALYZER OF MULTIDIMENSIONAL CYTOMETRY DATA

(71) Applicant: City of Hope, Duarte, CA (US)

(72) Inventors: Seth Michael Hilliard, Yelm, WA (US); Karen Mosoyan, Glendale, CA (US); Andrei Rodin, Duarte, CA (US)

(73) Assignee: City of Hope, Duarte, CA (US)

( * ) Notice: Subject to any disclaimer, the term of this patent is extended or adjusted under 35 U.S.C. 154(b) by 0 days.

(21) Appl. No.: 18/481,940

(22) Filed: Oct. 5, 2023

(65) Prior Publication Data

US 2024/0119065 A1  Apr. 11, 2024

Related U.S. Application Data

(60) Provisional application No. 63/413,635, filed on Oct. 6, 2022.

(51) Int. Cl.
*G06F 16/28* (2019.01)
*G06F 16/2457* (2019.01)

(52) U.S. Cl.
CPC ...... *G06F 16/283* (2019.01); *G06F 16/24573* (2019.01)

(58) Field of Classification Search
USPC ........................................................ 707/754
See application file for complete search history.

(56) References Cited

U.S. PATENT DOCUMENTS

| | | | |
|---|---|---|---|
| 6,282,440 B1* | 8/2001 | Brodnick | A61B 5/341 600/512 |
| 8,214,323 B2* | 7/2012 | Zigon | G16H 10/40 707/763 |
| 2008/0172185 A1* | 7/2008 | Yi | G01N 33/5005 702/21 |
| 2012/0215487 A1 | 8/2012 | Banville et al. | |
| 2015/0080705 A1* | 3/2015 | Partanen | A61B 5/7264 600/411 |
| 2015/0330888 A1* | 11/2015 | Ramirez | G06T 7/136 702/182 |
| 2017/0102310 A1* | 4/2017 | Xu | G01N 15/1429 |
| 2017/0321281 A1* | 11/2017 | Iavarone | C12Q 1/6886 |
| 2018/0192936 A1* | 7/2018 | Widge | A61N 1/36139 |
| 2018/0340890 A1* | 11/2018 | Roederer | G06F 18/2415 |
| 2019/0303760 A1* | 10/2019 | Kumar | G06V 10/82 |
| 2019/0352693 A1* | 11/2019 | Ramjeet | G01N 21/6428 |

(Continued)

*Primary Examiner* — Cam Linh T Nguyen
(74) *Attorney, Agent, or Firm* — Mintz Levin Cohn Ferris Glovsky and Popeo, P.C.

(57) ABSTRACT

Systems, methods, and computer readable storage mediums for performing multidimensional cytometry data analysis are described. The method includes filtering multidimensional cytometry data, based on a signal strength within each dimension of the plurality of dimensions, to select representative dimensions from the plurality of dimension, selecting an initial region within the representative dimensions of the multidimensional cytometry data. The initial region can include a bin with a maximum significance level. A significant region of the representative dimensions, presenting a response different from a reference response, can be determined by expanding the initial region to regions with a set significance. A display including the significant region of the representative dimensions of the multidimensional cytometry data can be generated.

14 Claims, 6 Drawing Sheets

(56) References Cited

U.S. PATENT DOCUMENTS

| | | | |
|---|---|---|---|
| 2020/0077892 A1* | 3/2020 | Tran | G08B 21/02 |
| 2020/0245960 A1* | 8/2020 | Richter | G06V 20/695 |
| 2022/0084662 A1* | 3/2022 | Das | A61B 5/02055 |
| 2022/0390349 A1* | 12/2022 | Roberts | G01N 15/1459 |
| 2023/0067798 A1* | 3/2023 | Kwon | G06T 7/0012 |
| 2024/0153289 A1* | 5/2024 | Masaeli | G06V 10/762 |

* cited by examiner

AUTOMATIC ANALYZER OF MULTIDIMENSIONAL CYTOMETRY DATA

CROSS-REFERENCE TO RELATED APPLICATIONS

This application claims the benefit of priority to U.S. Application No. 63/413,635 filed Oct. 6, 2022, the disclosure of which is incorporated by reference herein in its entity.

STATEMENT AS TO RIGHTS TO INVENTIONS MADE UNDER FEDERALLY SPONSORED RESEARCH AND DEVELOPMENT

This invention was made with Government support under R01 LM013138, and U01 CA232216 awarded by the National Institutes of Health. The Government has certain rights in the invention.

TECHNICAL FIELD

This disclosure generally relates to automatic analysis of multidimensional data, such as flow cytometry data, to determine where the largest signals occur to differentiate between data classes.

BACKGROUND

Current state of the art flow cytometry analysis is based on visual exploration of multidimensional data (including approximately 40 dimensions) using charts of two dimensions at a time. The visual exploration is often semi-arbitrary and user dependent in nature, with high inter-user variability and low reproducibility. The nature of using two dimensions at a time leads to a sequence dependent result, as populations that may be obvious in one two-dimensional visualization may be obscured in another view due to the nature of projecting high-dimensional data into low-dimensional spaces. The manual process based on visual exploration can also be extremely time consuming. The manual process based on visual exploration can rely on archaic/simplistic means of quantifying significant results in a given experiment, such as simple T-testing to determine if a population is different between classes, which is often dependent on user-defined parameters that increases inter-user variability and low reproducibility.

SUMMARY

Systems for automatic analysis of multidimensional data are provided. The systems performing automatic analysis of multidimensional data, as optimized by a machine learning model, are described. Related apparatus, systems, techniques and articles are also described.

In one aspect, a method includes filtering, by one or more processors, multidimensional cytometry data, based on a signal strength within each dimension of the plurality of dimensions, to select representative dimensions from the plurality of dimensions, selecting, by the one or more processors, one or more initial regions within the representative dimensions of the multidimensional cytometry data, the initial region including a bin with a maximum significance level, determining, by the one or more processors, one or more significant regions of the representative dimensions of the multidimensional cytometry data by expanding the initial regions to regions with a set significance, and generating, by the one or more processors, a display including the significant regions of the representative dimensions of the multidimensional cytometry data.

In some implementations, the method can include dividing, by the one or more processors, the representative dimensions of the multidimensional cytometry data in a plurality of bins of a set size. The method can include merging, by the one or more processors, significant bins of the plurality of bins that are within the significant region of the representative dimensions of the multidimensional cytometry data. The method can include adding, by the one or more processors, markers to the significant region of the representative dimensions of the multidimensional cytometry data. The representative dimensions include a user-defined number of dimensions and the plurality of dimensions include the entire number of dimensions. The multidimensional cytometry data includes flow cytometry data. Each dimension of the multidimensional cytometry data includes signaling data representing one or more measurement values related to a test substance. Determining, by the one or more processors, the significant regions of the representative dimensions of the multidimensional cytometry data by expanding the initial regions to regions with the set significance includes performing a correlation analysis and selecting to add bins with a correlation coefficient above a set threshold to the significant region. Any of filtering the multidimensional cytometry data, selecting the initial region, and determining the significant region includes a machine learning algorithm. The method can include receiving, by the one or more processors, a user input, and updating, by the one or more processors, the machine learning algorithm based on the user input. The method can include generating, by the one or more processors, a predictive assay based on the significant region. The bin includes a rectangular geometry or a hyperrectangular geometry. The method can include receiving, by the one or more processors, metadata associated with the multidimensional cytometry data. The signal strength includes a response of a sample to one of a variety of conditions. The one or more significant regions present a difference associated with a disease, a responder to a therapy, a biochemical stimulation, a molecular stimulation, an in vivo condition, an in vitro condition, a time point, a cohort, or any cytometry measurement parameter.

Non-transitory computer program products (e.g., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to automatic analysis of multidimensional cytometry data to identify significant signals. More particularly, implementations of the present disclosure include an analytical instrument system and a method for automatically analyzing multidimensional flow cytometry data corresponding to biological samples. The automatic analysis of flow cytometry data can use a signal strength within each dimension to select representative dimensions and an initial region with a maximum significance level within the representative dimensions. The automatic analysis of flow cytometry data can expand the initial region based on bin significance to define a significant region. The significant region can be displayed with markers that highlight the results. The flow cytometry data analysis can generate highly reproducible results that include information that enables cell classification, which can be used for biomarkers discovery, gaining biological insight, patient diagnosis and treatment. The automatic analysis of flow cytometry data, as described herein, can include a machine learning model that can be applied in every phase, such as to obtain optimal binning structure, to merge and "grow" bins according to an optimized criterion, and analyzing according to maximal predictive capacity of a model on a sub-region of data.

The results of the flow cytometry data analysis, as described herein, can be improved, in terms of reproducibility and accuracy, by total automation of the process. The total automation is distinguished in that an operator (user device) does not intervene in the sample preparation process or analysis of the sample, once the sample, e.g., excised tissue, blood, urine, saliva etc., is provided to the fluorescent cytometer instrument. Additionally, the sample handling, and sample imaging are carried out automatedly based upon the tests selected by the operator. All data and other information pertaining to the flow cytometry analysis can be monitored and processed by a computing system coupled to the fluorescent cytometer instrument, such as an instrument controller.

Figure 1:
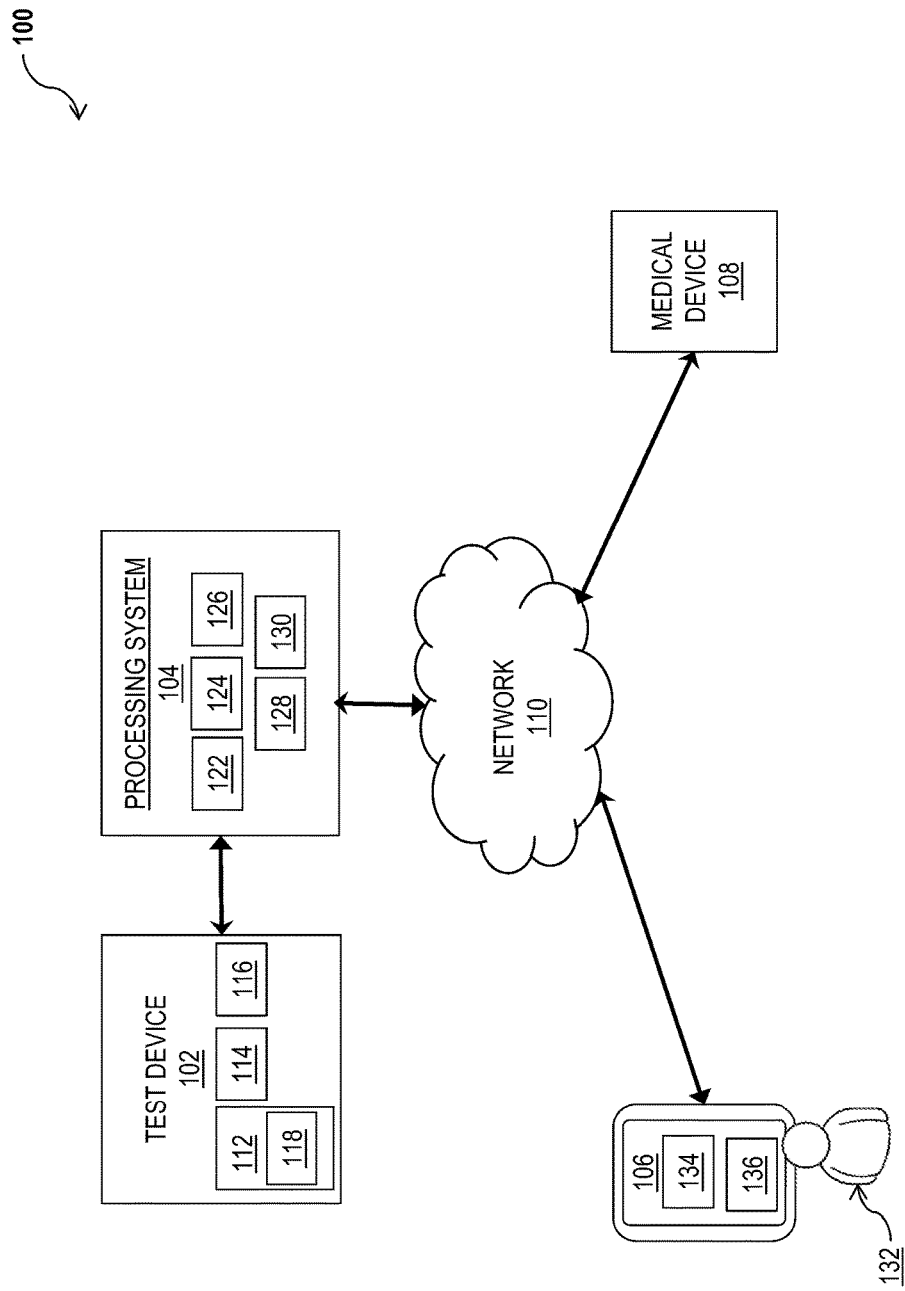
FIG. 1 illustrates an example of a system, according to some implementations of the current subject matter.

FIG. 1 illustrates an example of system 100, according to some implementations of the current subject matter. The system 100 may include a test device 102, a processing system 104, a user equipment 106, a medical device 108, and a network 110. As discussed in further detail herein, the test device 102 can include a device configured to generate multidimensional data (generally including approximately 10 dimensions to approximately 40 dimensions or potentially more than 40 dimensions). For example, the test device 102 can include a flow cytometer that may perform spectral flow cytometry, in which one or more spectral emission measurements are performed to determine a spectral emission spectrum of a sample. In some implementations, the test device 102 can perform data preprocessing/calibration.

The test device 102 (flow cytometer) may include, for example, a sample setting 112 (e.g., flow cell), a beam source 114 (e.g., excitation light source), and a detector 116. The sample setting 112 can be configured to perform one or more operations to enable imaging of a sample 118. For example, the sample setting 112 can include a flow cell that includes a fluid stream carrying one or more particles, such as extracellular vesicles from the sample 118, in a single file through a beam generated by the beam source 114. In some cases, the beam source 114 can include one or more lamps (e.g., mercury, xenon), high-power water-cooled lasers (e.g., argon, krypton, dye laser), low-power air-cooled lasers (e.g., argon (488 nanometers), red helium-neon (633 nanometers), green helium-neon, helium cadmium (ultraviolet)), and diode laser (e.g., blue, green, red, violet).

The detector 116 can measure a response of the interaction between the beam and the sample. For example, the detector 116 can detect the fluorescence intensity of the light emitted by a portion of the sample 118 (e.g., selected cell types or extracellular vesicle) in response to being exposed to the beam generated by the beam source 114. In some implementations, the sample 118 may be treated with a dye and/or can include labels that can enhance the detection of the detector 116. For example, particular cell types of the sample 118 can be stained with a selected color dye (e.g., a lipophilic dye, having a spectral emission spectrum corresponding to the lipid composition of a cell or extracellular vesicle present in the sample). The fluorochrome label can be attached to an antigen or antibody on the cell's surface thus indicating the occurrence of a specific antigen-antibody reaction. In some implementations, a combination of multiple dyes (each targeting a single cell type) and fluorochrome labels can be used in a single sample. The detector 116 can be configured to detect dye-specific and fluorochrome label specific fluorescence signals emitted by different regions of the sample 118. The detector 116 can generate a result set including sample measurements (e.g., spectral emission measurements for each region of the sample 118).

The result set, generated by the detector 116, can include multidimensional data, for example, dimension of the result set corresponding to a particular setting of the beam source 114. For example, the result set can include measurements with multiple dimensions, each corresponding to a wavelength of light in the visible spectrum between 350 nanometers and 800 nanometers. The set of spectral emission measurements for regions of the sample 118 can include a signal strength, such as a first fluorescence intensity of a first wavelength of light emitted by the dyed and/or labeled portion of the sample 118 in response being exposed to the beam (excitation light) source 114 and a second fluorescence intensity of a second wavelength of light emitted by the dyed and/or labeled portion of the sample 118 in response to being exposed to the beam (excitation light) source 114. Furthermore, in some cases, the set of spectral emission measurements for each region of the sample 115 may include a maximum, a minimum, a mean, a mode, and/or a median fluorescence intensity exhibited by the dyed and/or labeled portion of the sample 118 in response to being exposed to the beam having a particular characteristic (e.g., wavelength) generated by the beam (excitation light) source 114. The detector 116 can transmit the detected (spectral emission) measurements to the processing system 104. For example, in response to determining that the detection process is completed, the detector 116 can automatically transmit the detected (spectral emission) measurements to the processing system 104.

The processing system 104 can include any type of other or processor-based device configured to receive and process the result set, generated by the detector 116, including multidimensional data. The processing system 104 can include a display 122, a processor 124, a memory 126, a storage 128, and a communication interface 130. The processor 124 can process instructions for execution of implementations of the present disclosure. For example, the processor 124 can automatically process the multidimensional data for display using the display 122. The processing can include, but is not limited to, instructions stored in the memory 126 to display, as graphical information on the display 122, identified significant regions of the sample 115 based on an automatically selected reduced dimension representation of the dataset that includes significant signals, corresponding to the spectral emission spectrum of the targeted portions of the sample. Example displays 122 include, but are not limited to, a thin-film-transistor (TFT) liquid crystal display (LCD), or an organic light emitting diode (OLED) display.

The memory 126 stores information within the processing system 104. In some implementations, the memory 126 can include a volatile memory unit or units, and/or a non-volatile memory unit or units. In other implementations, removable memory can be provided, and can include, but is not limited to, a memory card. Example memory cards can include, but are not limited to, a secure digital (SD) memory card, a mini-Secure Digital (SD) memory card, a Universal Serial Bus (USB) stick, and the like.

The one or more storages 128 may include one or more physical storage media or devices (e.g., hard disk drives, persistent flash memory, random access memory, optical media, magnetic media, and the like) configured for storing processed and unprocessed sensor data for long term storage. It should be noted that the storage 128 can be included in the processing system 104, as shown in FIG. 1, or can be external to the processing system 104.

The storage 128 can include a historian database (or plant asset database) for access by the processor 124 (executing on system computers) to build/train a predictive model to determine significant regions of representative dimensions of the multidimensional data. Based on the type of output data archived by the storage 128, for a process variable, the processor 124 may build/train a predictive inferential model, such as a machine learning model, configured to optimize any of any of filtering the multidimensional data, selecting the initial region, and determining the significant region. The storage 128 can store significant regions of particular samples and user feedback corresponding to the identified significant regions received from the user equipment 106 to optimize future identifications of significant regions. The processing system 104 can transmit, using the communication interface 130, the processing result including the detected significant region and, optionally, an associated recommended treatment, to the user equipment 106 and the medical device 108.

The user equipment 106 can include a computer, a smart phone, a tablet, an Internet of Things (IoT) device, and/or other computer or processor-based devices accessible by a user 132. The user equipment 106 may include a display 134 and an input interface 136. The display 134 can enable the user 132 to visualize the displayed significant region of the multidimensional data. The input interface 136 can enable the user 132 to provide a user input associated with the displayed significant region of the multidimensional data including an adjustment of the significant region and/or approval of a treatment to be performed by the medical device 108. In some implementations, the input interface 136 can include a keyboard, a touchscreen, a mouse, a trackball, a microphone, a touchpad, and/or appropriate combinations thereof. In some implementations, an audio codec (not shown) can be provided, which receives audible input from a user or other source through a microphone and converts the audible input to usable digital information. The audio codec can generate audible sound, such as through a speaker that is provided with the user equipment 106. Example sounds can include sound from voice telephone calls, recorded sound (e.g., voice messages, music files, etc.), and/or sound generated by applications operating on the user equipment 106. The user equipment 106 can process the user input to generate and transmit a treatment trigger to the processing system 104 and/or medical device 108 to modify an operation of the medical device 108 (e.g., initiate a treatment of a patient).

The medical device 108 can be configured to extract the sample data from a patient and/or deliver a treatment to the patient in response to receiving a treatment trigger from the processing system 104 or the user equipment 106. The test device 102, the processing system 104, the user equipment 106, and the medical device 108, can communicate over the network 110 through a connectivity interface(s). In some implementations, the connectivity interface(s) can include a satellite receiver, cellular network, a Bluetooth system, a Wi-Fi system (e.g., 802.x), a cable modem, a DSL/dial-up interface, a private branch exchange (PBX) system, and/or appropriate combinations thereof. Each of these connectivity interfaces enables data to be transmitted to/from the network 110. In some implementations, the network 110 can be provided as a local area network (LAN), a wide area network (WAN), a wireless LAN (WLAN), a metropolitan area network (MAN), a personal area network (PAN), the Internet, and/or combinations thereof.

The example of system 100 described with reference to FIG. 1 enables automatic analysis of multidimensional data providing results identifying significant regions of the data with descriptions of the results. The results generated by the example of system 100 can provide an assay design for the best pre-treatment biomarkers to use in a commercial setting. The example of system 100 can optimize data processing, translating into massive processing cost reductions for a given analysis while improving the quality of results by increasing the result accuracy and reproducibility.

In some embodiments, the example of system 100 described with reference to FIG. 1 may enable the development of an assay design. For example, pre-treatment peripheral blood mononuclear cell (PBMC) based data can be analyzed to determine better drug efficiency, create treatment plans, and make informed decisions about treatments. For example, data from an experiment with two sets of patients, where a first set of patients receives a given a drug, and a second set patients receives a placebo may be analyzed. Using the techniques described herein regions of potential signals the most predictive individual markers associated with those signals can be determined to better determine drug efficacy and form a treatment plan.

Figure 2A:
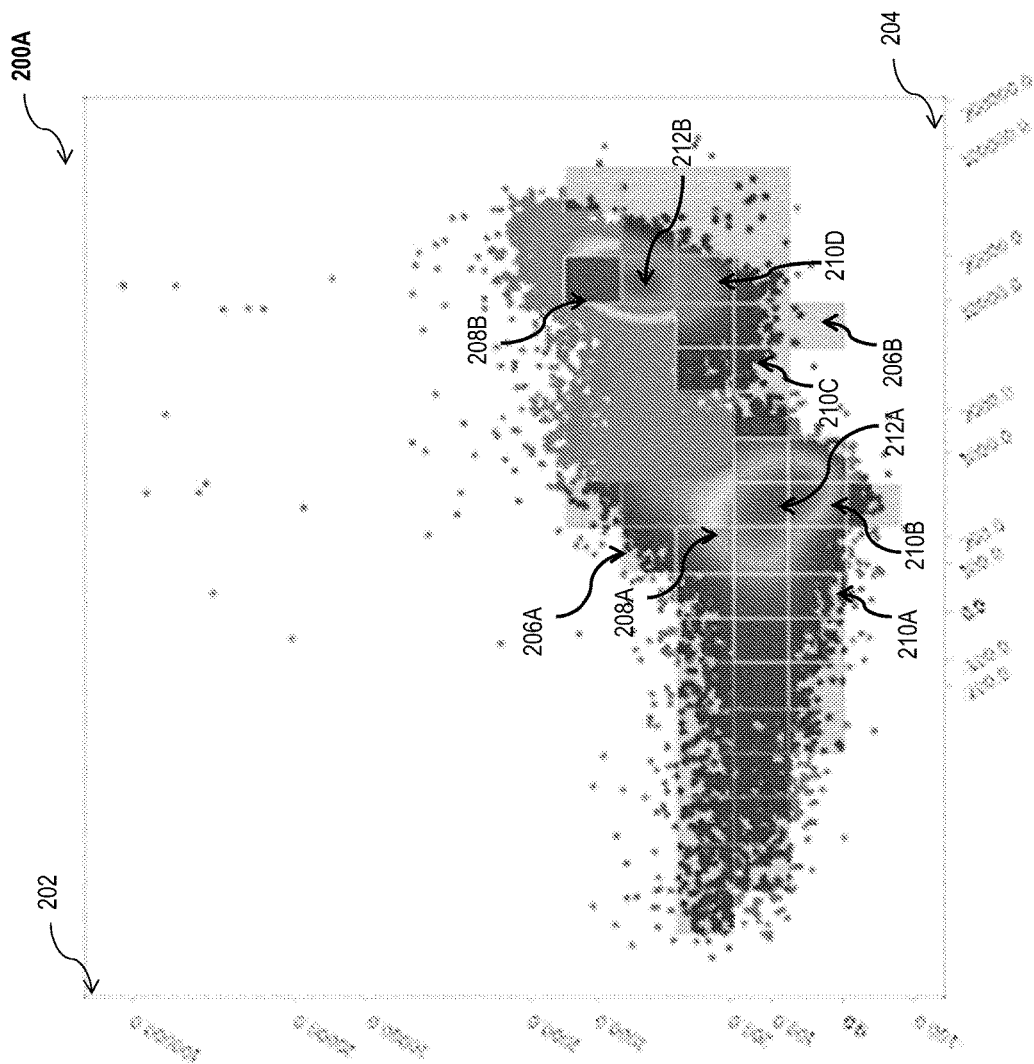
FIGS. 2A and 2B illustrate examples of output graphs, according to some implementations of the current subject matter.
Figure 2B:
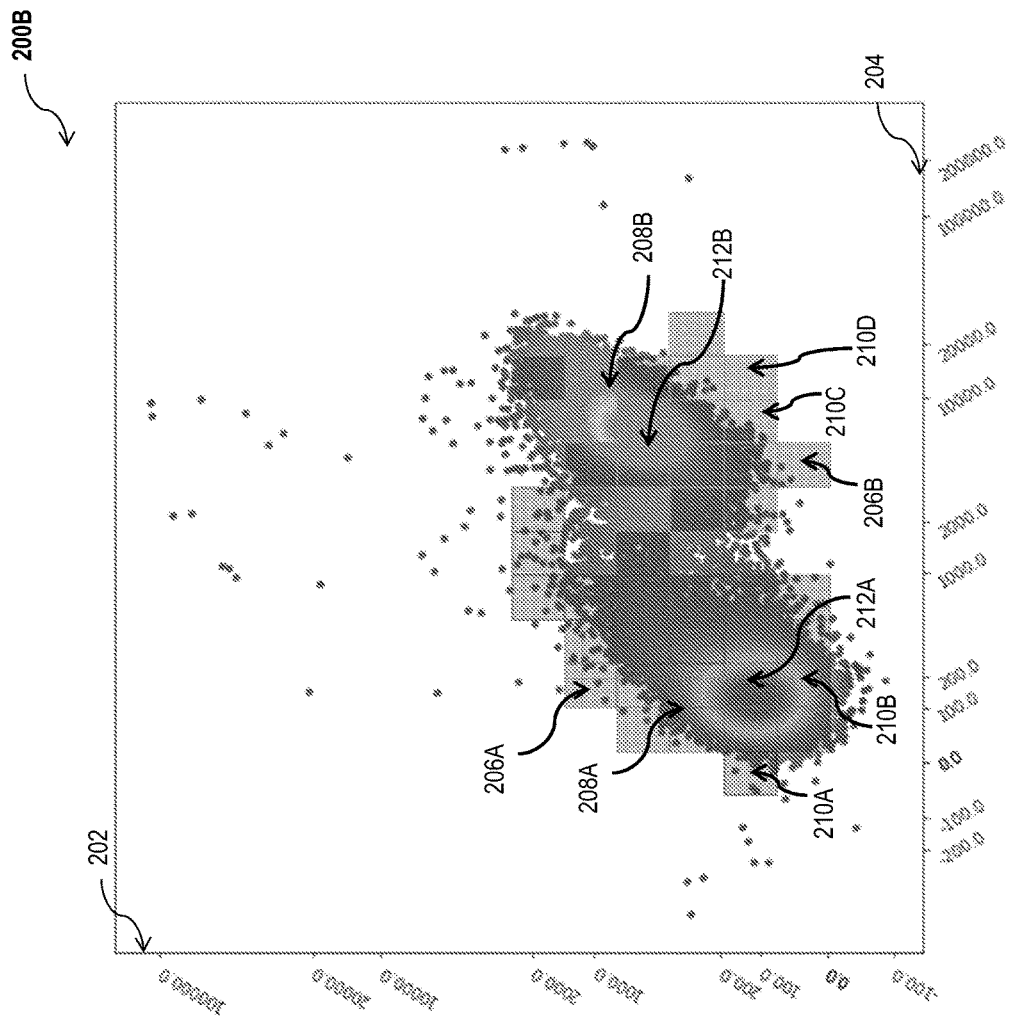

FIGS. 2A and 2B depict screenshots illustrating examples of user interfaces displaying examples output graphs 200A, 200B that can be generated by a processing system (e.g., processing system 104 of FIG. 1) executing the process described with reference to FIG. 3. For example, the examples output graphs 200A, 200B illustrate identification of significant regions for different dimensions corresponding to different wavelengths targeting different sample variables 202, 204 (e.g., presence of phycobiliproteins, such as Phycoerythrin (PE) 202 and allophycocyanin (APC) 204). The example of the user interface (e.g., input interface 136 described with reference to FIG. 1) can display the examples output graphs 200A, 200B with markers (colored overlays) 206A, 206B of the merged regions 208A, 208B that include multiple bins 210A, 210B, 210C, 210D identified through expansion of the initial region 212A, 212B to regions with a set significance. For instance, each examples output graphs 200A, 200B includes the visual representation of the merged regions 208A, 208B that each corresponds to a dimension of the select representative dimensions from the plurality of dimensions presenting significant signals in the sample (e.g., sample 118 described with reference to FIG. 1).

Figure 3:
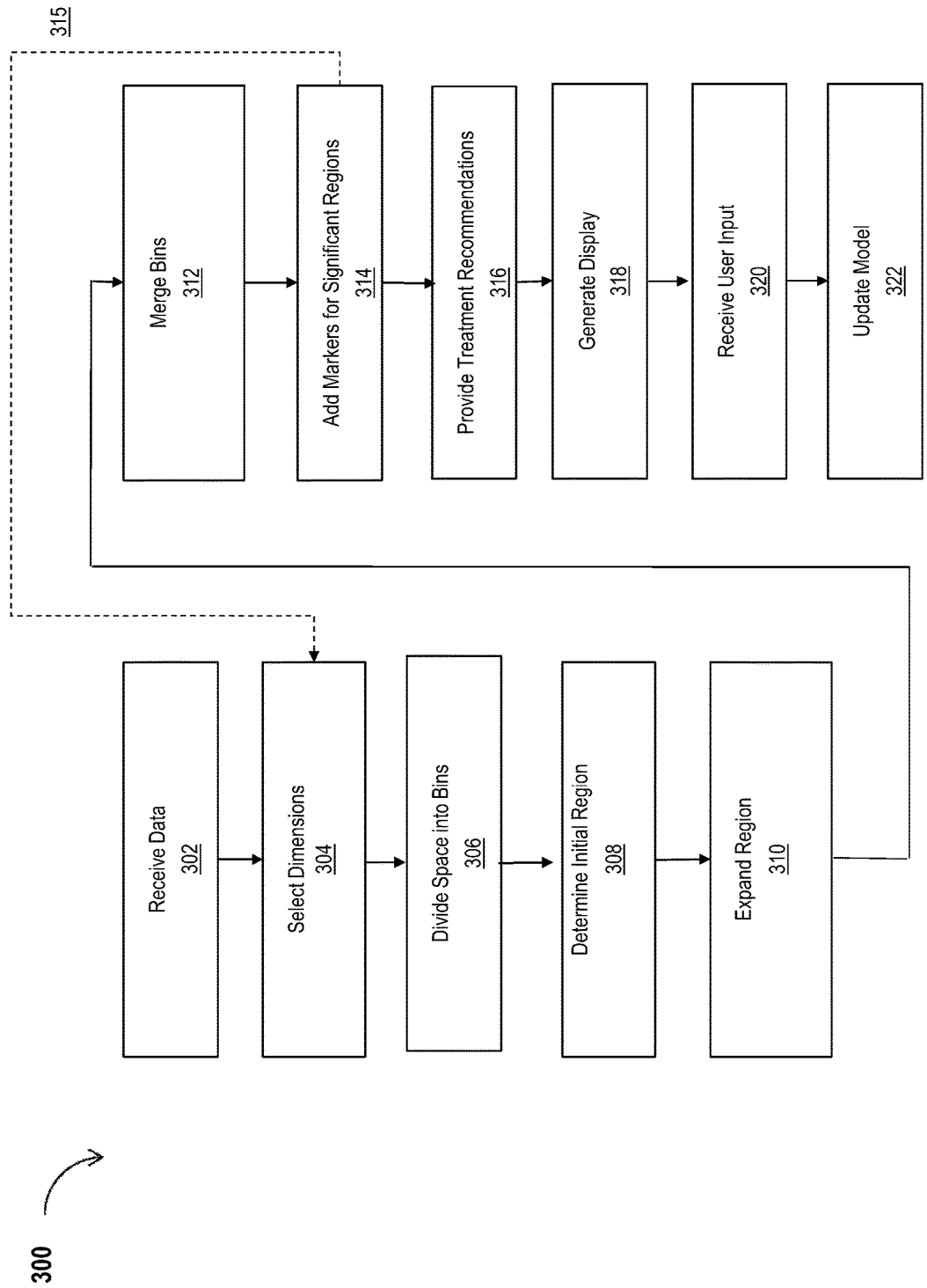
FIG. 3 illustrates an example of a process flow diagram, according to some implementations of the current subject matter.

FIG. 3 is a process flow diagram illustrating an example process 300 for automatic analysis of multidimensional cytometry data. Utilizing automatic analysis of multidimensional cytometry data can facilitate accurate and reproducible identification of significant regions in a multidimensional cytometry data. The significant regions can refer to the difference between contrasting samples, for example (but not limited to) health versus disease, responder to a therapy versus non-responder to a therapy, sample undergoing biochemical/molecular stimulation versus sample without, two samples under different in vivo or in vitro conditions, two samples corresponding to different time points, two samples from different cohorts, or any other types of differences that can be captured in multidimensional cytometry data.

At 302 multidimensional cytometry data is received. The multidimensional cytometry data can be received, by a processing device (e.g., processing system 104, described with reference to FIG. 1) from a test device (e.g., test device 102, such as a flow cytometer, described with reference to FIG. 1) configured to generate multidimensional cytometry data. The multidimensional cytometry data can include spectral emission measurements of a sample. The sample may be a biological sample or a derivation of a biological sample such as a purified biological sample, an enriched biological sample, and/or the like. Moreover, the sample can include a variety of biological matter including, for example, one or more tissue fragments, free cells, body fluids, and/or the like. In some example embodiments, the sample can be treated for fluorescent emissions. For instance, the sample can be treated with dyes and including labels that can enhance the detection of the sample characteristics (e.g., protein composition). Each dimension of the data can correspond to spectral emission measurements corresponding to a particular wavelength of the multiple wavelengths (within approximately 350 nanometers and 800 nanometers) used for sample testing and, optionally, metadata (e.g., data associated with an experimental file) associated with data produced by the test device. The multidimensional cytometry data can include an array of signal intensities (fluorescence intensity of the light emitted by each portion of the sample) corresponding to a response of sample characteristics detected at each set wavelength forming fifteen or more dimensions, such that the multidimensional cytometry data can be a multi-dimensional data dataset (e.g., a fifteen-dimensional data space). The multidimensional cytometry data can be received in a set format or can be formatted to match the set format.

At 304, representative dimensions are selected by filtering the multidimensional cytometry data, based on a signal strength within each dimension of the plurality of dimensions. The signal strength can include a response of a portion of a sample to one of a variety of conditions, as measured by a test device, as described with reference to FIG. 1. In some implementations, a limited number (e.g., 2, 3 or 4) of representative dimensions are selected from the plurality of total dimensions such that a selected number of dimensions with highest (averaged or median) signal strength are identified as representative dimensions and the remaining dimensions of the multidimensional cytometry data. In some implementations, the representative dimensions are selected using a gate boundary, such as a multi-dimensional gate boundary (e.g., a two-dimensional gate boundary). In some embodiments, the gate boundary can include hyperplanes (e.g., hyperplanes between vertices). For example, a gate boundary can include or be defined, at least in part, by planes within a three-dimensional data space that includes data points associated with a three-dimensional dataset configured to remove unneeded portions by filtering out multiple dimensions.

At 306 representative dimensions of the multidimensional cytometry data are divided into bins of a set size. The bins can include square, rectangular, hexagonal or cubic bins. For example, data of each representative dimension pair can be divided into an integer number (e.g., 10 to 50) of bins (windows) of a set bin size (that can be varied to increase a result accuracy). Each point of the representative dimensions can be evaluated in a loop to identify to which bin it belongs, the bin identification being based on the comparison of the point coordinates to the coordinates of the bin margins. After the bins are counted and the data point to bin association is established, data points of the representative dimensions are grouped so that all data points associated to a bin are assigned to the respective bin. For example, a bin list can be created by defining the marginal points (e.g., leftmost points, rightmost points, top points and bottom points). The size of the bin can be calculated in each dimension as a bin step (difference between marginal points divided by the number of bins). The matrix of divisions can be generated for making the bins defined as an array including the data points between the defined margins and grouped based on the bin step. In some implementations, the bin step can be resized to exclude deviating data and data anomalies and to generate an increased differentiation between significant and insignificant signals.

At 308, an initial region is determined. The initial region can be determined to include a single bin that has a maximum significance level, as determined by user, for a sample characteristic. For example, the fluorescence intensity of each bin can be calculated as a function (average or median) of the fluorescence intensity of all points within each bin. The fluorescence intensity of all bins for each representative dimension can be ranked and the bin with the highest fluorescence intensity for a respective representative dimension can be identified and selected as the initial region for the respective representative dimension.

At 310, the initial region is expanded to a significant region of the representative dimensions with a set significance. The significant region can be used to identify portions of the data with significant signals that are above a threshold.

The selection threshold can include a dynamic threshold that can represent a percentage of the significance level. The significant region can include multiple bins corresponding to related measurements that are grouped using a correlation algorithm (e.g., Pearson correlation, cross correlation or autocorrelation). The values of signals within the bins included in the significant region correspond to a correlation coefficient above a set threshold. For example, the significant region can include all bins having correlation coefficients above a threshold defining a set minimum significance (closeness) level. In some implementations, the significant region can have a maximum size (number of bins), which can be combined with correlation ranking to select the bins to be included in the significant region. In some implementations, the significant region can include the initial region as a central (start) bin and a plurality of bins expanding outwards from the initial region in one or more directions (e.g., cross or spherical outward directions).

At 312, significant bins of the plurality of bins that are within the significant region of the representative dimensions of the multidimensional cytometry data are merged. In some implementations, the bins are merged though a loop that is repeated for a set number of times. The merging of bins can be based on a merging criterion including a function defining the assessment of the bin correlation significance (closeness) relative to the initial region or previously merged neighboring bins. The merging criterion can include a threshold defining a set minimum significance (closeness) level for merging a new bin to the initial region and/or previously merged neighboring bins to expand the merged region. In some implementations, the merged region can have a maximum size (number of bins), which once reached ends the merging process of additional bins. If the size of the significant region exceeds the maximum size of the merged region, a percentage of the significant region can be selected for merging the bins. In some implementations, the merging of bins can be performed in one or more directions (e.g., cross or spherical outward directions) having the initial region or bins identified as superbins as starting point(s) and propagating through all neighboring bins of the starting point(s). The superbins can include bins with significance (closeness) level exceeding a set threshold. In some implementations, superbins are created for each bin within the significant region. The superbins can be created based on the data entropy within the bins, based on the bin number, based on the correlation coefficient defining the directionality of the signal distribution and by converting the listed bins to a series. The significant region can include multiple superbins that can be added for bin merging with the condition of maintaining the merged region size smaller than a maximum size. If the merged region size is smaller than the maximum size, a neighboring superbin with the highest significance (closeness) level is selected for merging and is added to the merged region.

At 314, markers are added to the merged region of the representative dimensions of the multidimensional cytometry data (as illustrated by FIGS. 2A and 2B). The markers can include colored (blue, green, yellow, orange and/or red) highlights that can overlay the merged regions or the margins of the merged regions. In some implementations, a color of the marker or a color intensity can be used to indicate a significance level of the merged region. At 316, treatment recommendations can be added to control sample characteristics. In some implementations, a merged region of a particular size for a representative direction can be associated to a treatment recommendation.

At 318, a display including output graphs (e.g., examples output graphs 200A, 200B described with reference to FIGS. 2A and 2B) is generated. The output graphs can illustrate identification of merged regions for different dimensions corresponding to different wavelengths targeting different sample variables (e.g., presence of phycobiliproteins, such as PE and APC). The user interface (e.g., input interface 136 described with reference to FIG. 1) can display the output graphs with the added markers (colored overlays) over the bins included in the merged regions. For instance, the output graphs can include a visual representation of the significant regions that each corresponds to a dimension of the select representative dimensions from the plurality of dimensions presenting significant signals in the sample (e.g., sample 118 described with reference to FIG. 1). In some implementations, the user interface can display the recommended treatment that corresponds to a dimension of the representative dimensions that could be performed by a medical device (e.g., medical device 108, described with reference to FIG. 1).

At 320, a user input is received. The user input can be associated with the displayed significant region of the multidimensional data including an adjustment of the significant region and/or approval of a treatment to be performed by the medical device.

At 322, a machine learning model used for any of filtering the multidimensional cytometry data, selecting the initial region, and determining the significant region and merged region can be updated based on the user input. The machine learning model can be based on linear regression and a gradient boosting algorithm, on a Mahalanobis distance (MD), MD with principal component analysis (PCA), MD with kernel PCA, MD with fast independent component analysis, on class support vector machine and isolation forest. The model can be trained for each dimension and/or new sample. The model can perform any of filtering the multidimensional cytometry data, selecting the initial region, and determining the significant region and merged region can be updated based on the user input based on machine learning models, for fluorescence intensity signals corresponding to a particular dimension.

Then machine learning can be utilized to identify past matches between dimensions and bins with particular characteristics (fluorescence intensity, signal entropy, and/or correlation coefficient), which were excluded through user input adjustments and can recommend matches between dimensions and bins with characteristics similar to the previously identified bin characteristics. Fixes to the past problems corresponding to the current problem can be utilized to efficiently manage analysis of multidimensional cytometry data. Machine learning can be used to process past multidimensional cytometry data, which can be searched to identify patterns that can be determined to match the current multidimensional cytometry data or thresholds which have failed. Treatment recommendations can be correlated with the current multidimensional cytometry data to provide an association between past treatment outcomes of subjects with samples presenting features similar to the features identified in the current multidimensional cytometry data.

In some implementations, unsupervised learning can update machine learning models as process conditions (e.g., sample preparation and/or detection methods) change. Machine learning models can learn whether an analysis result was correct or partially incorrect. This information can be used to update the model. For example, the next time multidimensional cytometry data is analyzed, the analysis can be more accurate. For process related updates, data can be continuously fed into the model. Whenever the data cannot fit the confidence bands of the model, the model can trigger recalibration. This can result in automatically updating the model. When the user analyzes the results (output graphs) of the multidimensional cytometry data analysis and specifies that one or more bins should be excluded from the merged region, the bin to be excluded is identified as a false positive and this information can be forwarded to the model. The user input can be sent to the machine learning model to use this information for reinforced learning of the model. As a result, the model can automatically be updated.

As discussed above, in some embodiments, filtering the multidimensional cytometry data to select representative dimensions as discussed in steps 302, 322 can be performed using a machine learning based process. For example, a classifier such as a random forest classifier can be applied to fluorescence cell data in order to generate a ranked table of importance for the markers present in the fluorescence cell data. In some embodiments, the random forest classifier can be coupled with SHAP values that provide an indication as to what dimensions are most important. Although classification techniques are described in alternative embodiments, neural networks such as dense neural networks or convolutional neural networks can be used to filter the multidimensional cytometry data to select representative dimensions.

In some embodiments, the selection of initial regions corresponding to steps 304 and/or 306 of FIG. 3 within the representative dimensions of the multi-dimensional cytometry data may be based on generating equal bin sizes based on fluorescence values. The output of this process may include the bins, the corresponding number of cells for each bin, and patient related information such as the number of cells for each patient and class of patient. Alternative techniques for the selection of the initial regions include clustering methods such as overfitted K-means clustering models and the like. In some embodiments, this process may utilize techniques that combine clustering and dimension reduction (e.g., principal components analysis).

In some embodiments, the expansion of an initial region to significant regions in order to determine regions with a set significance as was described in step 310 may include machine learning aspects. In other embodiments, step 310 may include statistical significance metrics. For example, neighboring regions of seed regions with similar statistics may be expanded and combined based on their statistical similarity or other traits such as class direction, predictiveness, the p-value for the hypothesis being tested, entropy, and the like. Statistical methods and/or machine learning can be applied to the bins formed in step 304, 306, 308 and the corresponding bin-statistics to generate a list of super regions. The list of super regions may include information regarding the included bins, the regions included in the super regions, and their respective p-values, significance values, and other statistical metrics for the regions and/or bins. The resulting data may be included in a report, graphical display or other otherwise provided to a user. In some embodiments, a loss function can be utilized in place of a classifier to generate the significant region.

As described above, spatial binning can be used to identify areas of interest in the fluorescence space. For example, a space can be divided into a number of bins along each dimension so that the interaction between different dimensions can be analyzed. After the space is binned appropriately, regions of interest can be identified using entropy and/or p-values. Once regions of interest are identified, the identified regions can be grown to include points outside of their initial bins. This may allow the disclosed systems to observe more free-form subsets of space and allow for improved flexibility. While the growing process may add points outside of the initial bin, the process may be configured to preserve the target significance of the initial area. For example, if the initial area is defined by an initial metric of maintaining p-values of less than 0.05, points will only be added in the growing process if this initial metric can be maintained. The set of bins resulting from the growing process can be referred to as a "superbin." Metrics used in these processes can include weighted entropy and p-value difference between classes.

In some embodiments, the resultant superbins can be evaluated on patient-level predictivity of the target class. For example, the superbins can be screened for those that are predictive on a patient-level. In an example, where the described system is used for binary classification, linear discriminant analysis (LDA) can be used to obtain an F1 score for predicting what class a sample belongs to. In some embodiments, irrelevant of an associated p-value for a region of individual cells, the current implementation discards any region with an associated F1 score below 0.5. In some embodiments, the LDA can be used on the number of cells from a given patient in a given superbin. The LDA classifier can be chosen for its small number of learnable parameters and the underlying assumption of normally distributed data being a good observed fit for the data outcomes. Then the predictivity of a given superbin is evaluated by the accuracy and F1 score of the learned LDA classifier. Classifiers can be monitored and adjusted to prevent overfitting to the data.

In some embodiments a machine learning classifier or regressor can be applied to the superbins. The machine learning classifier or regressor can be trained to predict the classes of certain cells of all patients. This classifier can be trained and tested on cells from predictive superbins found in the previous step with the goal of providing a framework for model explainability. In some embodiments, the machine learning classifier can include a Random Foreset classifier that is used for cell class prediction.

In some embodiments, model explainability techniques like SHAP can be used to rank the predictivity of every marker in relation to other markers, based on the classifier trained in the previous step.

The output of the process illustrated in FIG. 3 can include findings that are provided in comprehensive reports that include macro-level insights about predictive areas in the data as well as marker-level details on predictivity and interactions between markers.

In some embodiments, a subset of the steps illustrated in FIG. 3 can be run iteratively 315. For example, step 304 to step 314 (or any subset thereof) can be applied iteratively. For example, an iterative process can be used to find new markers as the number of selected dimensions is reduced.

Although classifiers are discussed herein, it is envisioned that alternative machine learning based techniques such as regressions could be used. For example, binary classifications, multiclass classification or regression tasks can be used.

While prior techniques have focused on cell type identification and cluster differentiation, systems and methods built in accordance with the disclosure herein can provide automated assay development, which can, for example, identify biomarkers that can predict a patient's response to a particular drug.

Figure 4:
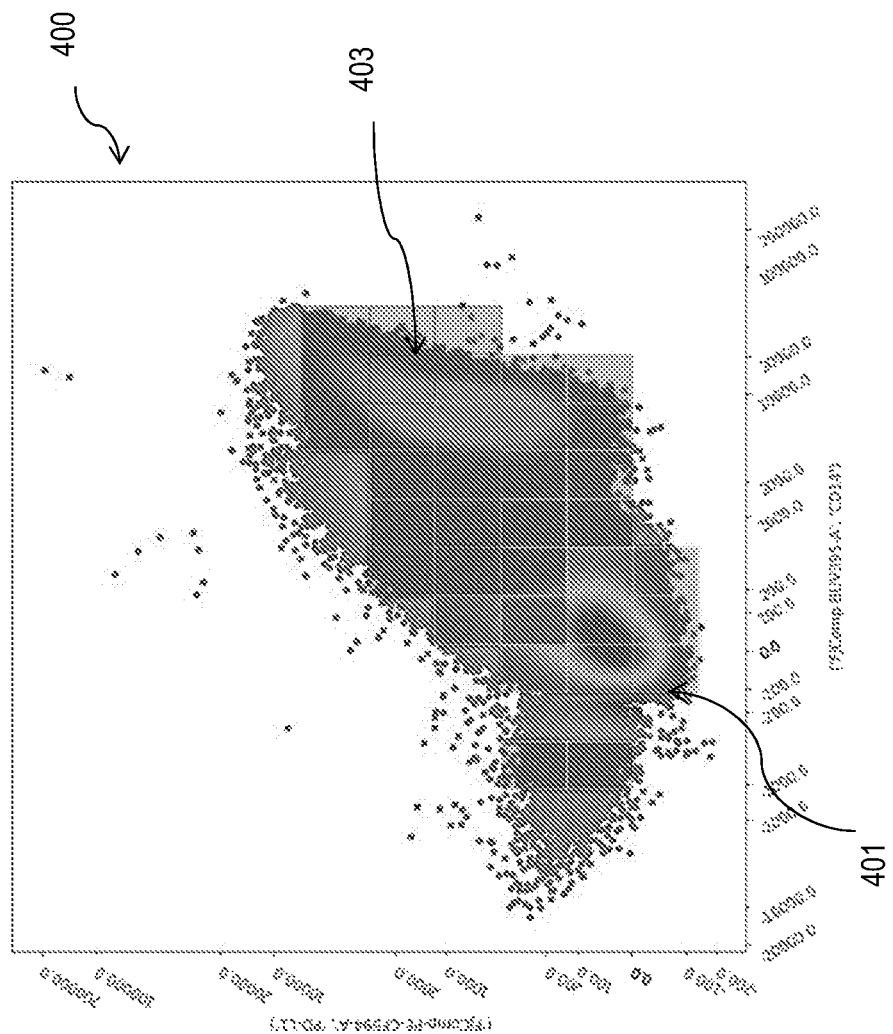
FIG. 4 illustrates an example of an output graph, according to some implementations of the current subject matter.

FIG. 4 depict screenshots illustrating examples of user interfaces displaying example output graph 400 that can be generated by a processing system (e.g., processing system 104 of FIG. 1) executing the process described with reference to FIG. 3. Illustrated in output graph 400 is data from one patient. A first region 401 signifies areas in which non-responders had a higher representation of cells. A second region 402 signifies areas in which responders had a higher representation of cells. The regions 401, 402 can be determined using all patients and then displayed on to a singular patient for visualization processes. The output graph 400 can be representative of 2-dimensional data or higher dimensional data.

Figure 5:
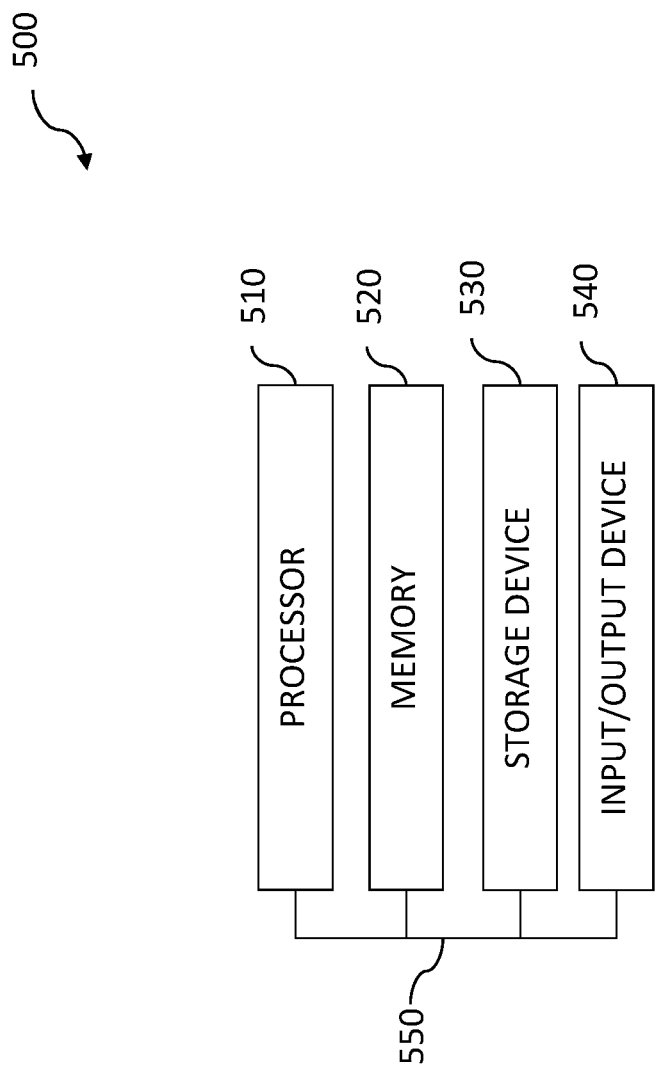
FIG. 5 is an example of system, according to some implementations of the current subject matter.

In some implementations, the current subject matter may be configured to be implemented in a system 500, as shown in FIG. 5. The system 500 may include a processor 510, a memory 520, a storage device 530, and an input/output device 550. Each of the components 510, 520, 530 and 540 may be interconnected using a system bus 550. The processor 510 may be configured to process instructions for execution within the system 500. In some implementations, the processor 510 may be a single-threaded processor. In alternate implementations, the processor 510 may be a multi-threaded processor. The processor 510 may be further configured to process instructions stored in the memory 520 or on the storage device 530, including receiving or sending information through the input/output device 540. The processor 510 may be further configured to execute the processes described with reference to FIGS. 2 and 3. The memory 520 may store information within the system 500. In some implementations, the memory 520 may be a computer-readable medium. In alternate implementations, the memory 520 may be a volatile memory unit. In yet some implementations, the memory 520 may be a non-volatile memory unit. The storage device 530 may be capable of providing mass storage for the system 500. In some implementations, the storage device 530 may be a computer-readable medium. In alternate implementations, the storage device 530 may be a floppy disk device, a hard disk device, an optical disk device, a tape device, non-volatile solid state memory, or any other type of storage device. The input/output device 540 may be configured to provide input/output operations for the system 500. In some implementations, the input/output device 540 may include a keyboard and/or pointing device. In alternate implementations, the input/output device 540 may include a display unit for displaying graphical user interfaces.

In some implementations, the disclosed system can be implemented across one or more processors, some of which are partially locally-installed and partially cloud-hosted. For example, analytical processes can be housed within the locally-installed portion, eliminating the need for end-users to upload their data to the cloud in any way, thereby circumventing any potential patient privacy issues (as the end-user will already need to have security practices implemented on the local machine running the software).

In some implementations, the current subject matter may include one or more of the following optional features. The received query may require access to the data stored in different locations in the database system. One or more locations in the database system may be considered a data consumption location and one or more other locations in the database system may be considered a data production location.

In some implementations, the plurality of fragments may include a root fragment and one or more non-root fragments. The root fragment may be configured to be executed at the data consumption location of the database system and may be further configured to receive data resulting from execution of the non-root fragments at the data production location of the database system.

In some implementations, execution of the root fragment may be configured to trigger execution of the non-root fragments. Further, execution of a query execution pipeline of the root fragment may include executing a receiving operator to receive data queried by the received query from one or more non-root fragments. Moreover, execution of a query execution pipeline of the non-root fragment may include executing a transmitting operator to transmit data queried by the received query to the root fragment. Additionally, each non-root fragment may be configured to be executed asynchronously.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:
    filtering, by one or more processors, multidimensional cytometry data comprising flow cytometry data comprising spectral emission measurements of a sample, based on a signal strength within each dimension of the plurality of dimensions and by applying a machine learning classifier, to select representative dimensions from the plurality of dimensions, wherein each dimension corresponds to spectral emission measurements for a particular wavelength among one or more wavelengths applied to the sample;
    selecting, by the one or more processors, one or more initial regions for each representative dimension of the multidimensional cytometry data by applying a clustering process, the initial region comprising a bin with a maximum significance level;
    determining, by the one or more processors, one or more significant regions for each representative dimension of the multidimensional cytometry data by expanding the initial regions to regions with a set significance by performing a correlation analysis and selecting to add bins with a correlation coefficient above a set threshold to the significant region, wherein the one or more significant regions of the representative dimensions respectively represent a different value associated with the same cytometry measurement parameter indicated by the representative dimensions;
    merging significant bins of the plurality of bins that are within the significant region of the representative dimensions of the multidimensional cytometry data;
    applying a trained machine learning classifier or regressor to the merged significant bins to predict the classes of certain cells in the sample; and
    generating, by the one or more processors, a display comprising the significant regions of the representative dimensions of the multidimensional cytometry data.

2. The computer-implemented method of claim 1, further comprising:
    dividing, by the one or more processors, the representative dimensions of the multidimensional cytometry data in a plurality of bins of a set size.

3. The computer-implemented method of claim 1, further comprising:
    adding, by the one or more processors, markers to the significant region of the representative dimensions of the multidimensional cytometry data.

4. The computer-implemented method of claim 1, wherein the representative dimensions comprise a user-defined number of dimensions and the plurality of dimensions comprise the entire number of dimensions.

5. The computer-implemented method of claim 1, wherein each dimension of the multidimensional cytometry data comprises signaling data representing one or more measurement values related to a test substance.

6. The computer-implemented method of claim 1, wherein any of filtering the multidimensional cytometry data, selecting the initial region, and determining the significant region comprises a machine learning algorithm.

7. The computer-implemented method of claim 6, further comprising:
    receiving, by the one or more processors, a user input; and
    updating, by the one or more processors, the machine learning algorithm based on the user input.

8. The computer-implemented method of claim 1, further comprising:
    generating, by the one or more processors, a predictive assay based on the significant region.

9. The computer-implemented method of claim 1, wherein the bin comprises a rectangular geometry or a hyperrectangular geometry.

10. The computer-implemented method of claim 9, further comprising:
    receiving, by the one or more processors, metadata associated with the multidimensional cytometry data.

11. The computer-implemented method of claim 1, wherein the signal strength comprises a response of a sample to one of a variety of conditions.

12. The computer-implemented method of claim 1, wherein the cytometry measurement parameter indicates a disease, a responder to a therapy, a biochemical stimulation, a molecular stimulation, an in vivo condition, an in vitro condition, a time point, and/or a cohort.

13. A non-transitory computer-readable storage medium coupled to one or more processors and having instructions stored thereon which, when executed by the one or more processors, cause the one or more processors to perform the operations of:
    filtering, by one or more processors, multidimensional cytometry data comprising flow cytometry data comprising spectral emission measurements of a sample, based on a signal strength within each dimension of the plurality of dimensions and by applying a machine learning classifier to select representative dimensions from the plurality of dimensions, wherein each dimension corresponds to spectral emission measurements for a particular wavelength among one or more wavelengths applied to the sample;
    selecting, by the one or more processors, one or more initial regions for each representative dimension of the multidimensional cytometry data by applying a clustering process, the initial region comprising a bin with a maximum significance level;
    determining, by the one or more processors, one or more significant regions for each representative dimension of the multidimensional cytometry data by expanding the initial regions to regions with a set significance by performing a correlation analysis and selecting to add bins with a correlation coefficient above a set threshold to the significant region, wherein the one or more significant regions of the representative dimensions respectively represent a different value associated with the same cytometry measurement parameter indicated by the representative dimensions;
    merging significant bins of the plurality of bins that are within the significant region of the representative dimensions of the multidimensional cytometry data;
    applying a trained machine learning classifier or regressor to the merged significant bins to predict the classes of certain cells in the sample; and
    generating, by the one or more processors, a display comprising the significant regions of the representative dimensions of the multidimensional cytometry data.

14. A system, comprising:
    a test device configured to generate multidimensional cytometry data comprising flow cytometry data comprising spectral emission measurements of a sample;
    at least one data processor coupled to the test device; and
    at least one memory storing instructions which, when executed by the at least one data processor perform the operations of:
    filtering multidimensional cytometry data, based on a signal strength within each dimension of the plurality of dimensions and by applying a machine learning classifier, to select representative dimensions from the plurality of dimensions, wherein each dimension corresponds to spectral emission measurements for a particular wavelength among one or more wavelengths applied to the sample;
    selecting one or more initial regions for each representative dimension of the multidimensional cytometry data by applying a clustering process, the initial region comprising a bin with a maximum significance level;
    determining one or more significant regions for each representative dimension of the multidimensional cytometry data by expanding the initial regions to regions with a set significance by performing a correlation analysis and selecting to add bins with a correlation coefficient above a set threshold to the significant region, wherein the one or more significant regions of the representative dimensions respectively represent a different value associated with the same cytometry measurement parameter indicated by the representative dimensions;
    merging significant bins of the plurality of bins that are within the significant region of the representative dimensions of the multidimensional cytometry data;
    applying a trained machine learning classifier or regressor to the merged significant bins to predict the classes of certain cells in the sample; and
    generating a display comprising the significant regions of the representative dimensions of the multidimensional cytometry data.

* * * * *